March 14, 1967 A. J. IVESTER ET AL 3,308,523
REINFORCED EXPANSIBLE SLEEVE AND METHOD OF MANUFACTURE
Filed Dec. 21, 1964

INVENTORS
GEORGE P. KNAPP
ALLAN J. IVESTER
BY,
ATTORNEYS

United States Patent Office 3,308,523
Patented Mar. 14, 1967

3,308,523
REINFORCED EXPANSIBLE SLEEVE AND
METHOD OF MANUFACTURE
Allan J. Ivester, Whitman, and George P. Knapp, Waban,
Mass., assignors to Mount Hope Machinery Company,
Taunton, Mass., a corporation of Massachusetts
Filed Dec. 21, 1964, Ser. No. 420,027
3 Claims. (Cl. 29—127)

This invention relates to improvements in reinforced expansible sleeves for covering rolls, and to an improved method of manufacture thereof. The invention has particular utility in curved rolls of the kind used for expanding sheet materials, and for straightening the weft of web materials, but is also applicable to straight cylindrical rolls. Sleeves of the type to which the invention relates are molded of elastomeric sleeve material in annular cylindrical form and have an internal helical winding of reinforcing cord. They are often made of the same length as the roll, but can be made in shorter sections and connected end-to-end after mounting on a roll. A roll of the latter type, in which sleeves made according to the present invention may be beneficially be utilized, is described and claimed by the copending application of John D. Robertson, Serial No. 218,330, filed August 21, 1962, now Patent No. 3,213,513, granted October 26, 1965, and entitled "Sectional Curved Roll," which is assigned to the assignee of the present application.

Cord reinforced sleeves of the type described are relatively harder to stretch circumferentially than elastomeric sleeves without such reinforcement. This allows rolls using helical reinforcing cord to operate at higher speeds than nonreinforced sleeves before the hoop tension produced by centrifugal force causes the sleeve to swell making it unusable at any higher speed. On the other hand, helically wound reinforcing cords do not appreciably inhibit longitudinal stretching such as is required in the operation of a curved roll.

Cord-reinforced sleeves have commonly been prepared by winding an inner core on a mandrel, winding it with cord in an open helix, and then winding on and curing an outer surface layer of elastomeric sleeve material about the core. This isures a sound bond between the core and outer layer, even though it may be difficult to obtain a good bond between the cord and the elastomeric sleeve material. However, such a structure is subject to some irregularity in the distribution of the cord within the body of the sleeve, so that a maximum strength may not be achieved for the quantity of cord used. Furthermore, distortion in the loops of cord frequently occur during the curing process, allowing the sleeve to stretch under the tensions produced by centrifugal force and thus considerably impairing the usefulness of sleeves of reinforced cord construction. An additional fault is that the core of sleeve material disposed interiorly of the cords serves little useful purpose other than to provide a good bond, as it is not available as a wearing surface. The sleeve becomes useless when it has worn sufficiently to expose the reinforcing cord. The elimination of this internal core material would reduce the total thickness of sleeve material, reduce the tensile load on the cords by eliminating the centrifugal stress which the core applies, and reduce the weight of the sleeve to permit the roll to turn more easily.

A still further fault with the conventional construction is the fact that variations in tension in the reinforcing cord while it is being wound result in variations in the amount by which the underlying core material is compressed while on the mandrel. This produces undesirable variations in the inside diameter of the finished roll.

It is the primary object of the present invention to provide an improved reinforced expansible sleeve which is characterized by increased and more uniform strength, and an increased useful life, for a given thickness of sleeve material. It is a further object to provide an improved method for making a reinforced expansible sleeve, which produces a secure bond between elastomeric sleeve material and reinforcing cords without an internal core of elastomeric material. It is another object to provide an improved method for manufacturing such a sleeve which results in a more uniform spacing of helical turns of reinforcing cord. It is a further object of the invention to provide an improved reinforced sleeve in which the physical characteristics of the internal and external surfaces may differ substantially to meet differing operating requirements. It is still another object to provide an improved method for making a reinforced expansible sleeve which is less complex and costly than previously-used methods known to us. Additional objects and advantages of the invention will become apparent as the following description proceeds.

Briefly stated, according to a preferred practice, the method of our invention is carried out by winding, on a cylindrical mandrel of the same diameter as the inside diameter of the completed sleeve, a closely packed helical coil of a precoated reinforcing cord or wire. The cord coating consists of an elastomeric material having suitable characteristics, which may or may not be the same material used for the body of the sleeve. The coating is of a uniform thickness, such as may be prepared by conventional extrusion processes; the close packing of the turns of the coil insures a uniform spacing of the cord in the finished sleeve. The helical winding is then coated with cement for the purpose of holding the coil form after the mandrel is removed. Coil sections corresponding in length to the finished sleeve sections are then cut from the coil, and each section is placed in a mold. The body of the sleeve section is molded about the coil and cured, being formed of an elastomeric material selected to give desired working surface characteristics and to bond securely to the coil coating.

The resulting sleeve makes substantially all of the body material available for wearing surface, since the entire body is external to the reinforcing cord. An improved ratio of strength-to-weight results from the uniform spacing of the reinforcing cord and the absence of a core of superfluous material interior to the cord. Furthermore, this method of production is less complex and costly than previously-known methods of which we are aware.

As an ancillary advantage, elastomeric materials having different physical characteristics may be chosen for the cord coating and the body of the sleeve. Particularly in applications of such sleeves to curved rolls, it is desirable that the external surface, which contacts sheet material to be treated, have a relatively high coefficient of friction so as to grip the sheet material securely. But the longitudinal expansion and contraction of the sleeve as it turns about a curved axle requires that the internal surface of the sleeve slide longitudinally on the roll, and a lower coefficient of friction is desirable for this surface.

Other material requirements may also differ. The external working surface should have high resistance to aging, abrasion, or deterioration through exposure to heat, steam, water or various chemicals present in the working environment; and should be castable or moldable. On the other hand, the coil coating may not be exposed to the working environment, but should be resistant to heat, abrasion and deterioration by contact with grease used in the bearings of the roll. A number of elastomeric materials may meet either or both working requirements, such as polyurethane, chloroprene rubber, or buna N. Where a very low coefficient of friction is desired for the coil coating, a material such as tetrafluoroethylene polymer may be used. Various other elastomeric materials may be used for both purposes, or used in different combinations.

While the specification concludes with claims particularly pointing out the subject matter which we regard as our invention, it is believed that a clear understanding may be gained from the following detailed description of preferred practices and embodiments of the invention, referring to the accompanying drawing, in which:

Figure 1:
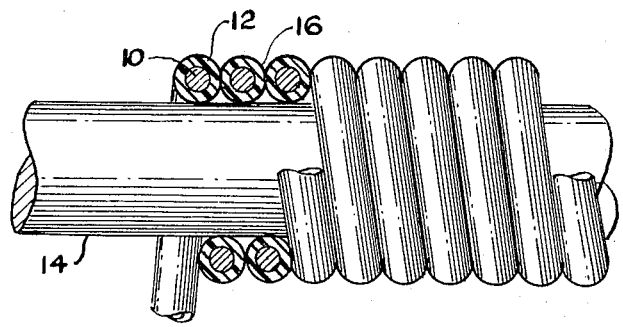
FIG. 1 is a fragmentary view showing a step of winding coated reinforcing cord on a mandrel.

Referring first to FIG. 1, the reinforcing cord or wire 10 is prepared in advance with a uniform coating 12 of a suitable elastomeric material, such as polyurethane, by extrusion or other conventional processes. If a very low coefficient of surface friction is desired at the interior surface of the finished sleeve, a material such as tetrafluoroethylene polymer may be used. The reinforcing cord may be of any material conventionally used for this purpose, such as metallic wire, nylon or rayon and it need not be such as would bond with an elastomer. The coated cord is wound in a close-packed helical coil on a cylindrical mandrel 14, whose diameter is equal to the inside diameter of the finished sleeve. The close packing of the turns insures a uniform longitudinal spacing of the internal cords, and consequently a uniform restraint against radial swelling by centrifugal forces, throughout the length of the sleeve. The mandrel is preferably first coated with grease or a suitable mold release compound to facilitate removal of the coil after the winding operation. Prior to its removal from the mandrel, the coil is coated with a quick-drying cement having sufficient strength to secure the turns together during handling, as at 16. Filleting may occur as at 17.

Figure 2:
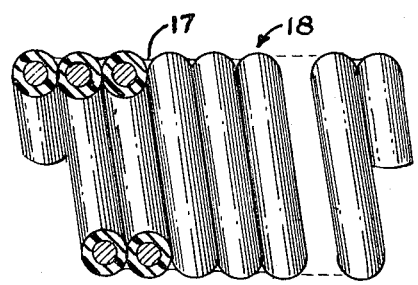
FIG. 2 is a view in elevation and partially in section of a finished coil section cut to length.
Figure 3:
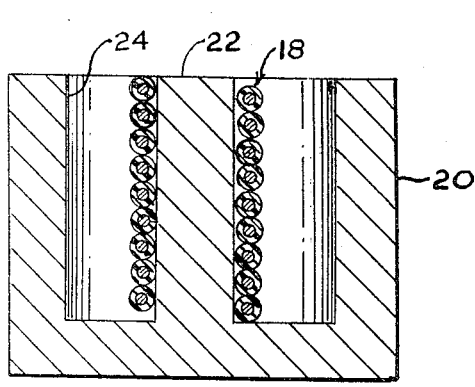
FIG. 3 is a sectional view showing a coil section loaded in a mold.
Figure 4:
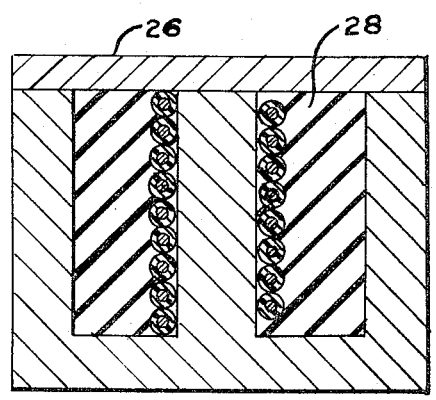
FIG. 4 is a sectional view showing the casting of a sleeve body about the coil section.

After removal of the coil, it is cut into sections 18, of which one is shown in FIG. 2, corresponding in length to the finished sleeve or sleeve section in which it is to be incorporated. The coil section 18 is then loaded into a mold 20 as shown in FIG. 3, having a cylindrical core 22 whose diameter is substantially equal to the inside diameter of the coil. The mold is formed with an annular cylindrical chamber 24 conforming to the desired finished dimensions of the sleeve section. The mold is then enclosed by a cover 26 shown in FIG. 4, and a body 28 of elastomeric material is formed about the coil section by conventional casting or molding methods, and suitably cured. Some materials may be cured entirely while in the mold, while others require a final curing step after removal; however, curing is performed in whatever fashion is conventional for the material selected. The curing step bonds the coil coating to the body of the sleeve. The technology of these processes is widely known, and no further detailed description thereof is believed necessary.

Figure 5:
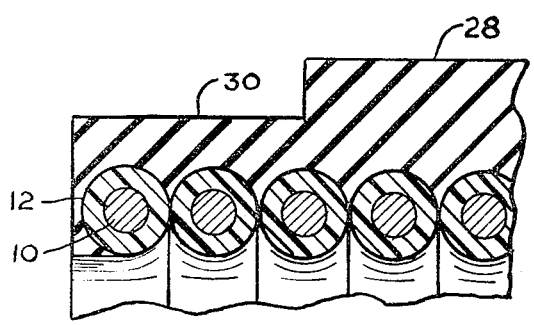
FIG. 5 is a fragmentary sectional view showing the structure of a sleeve section produced by our method.

After curing, the finished sleeve section is removed from the mold and is ready for installation. The structure of the sleeve is shown in FIG. 5. An end portion of the section may be ground to form a reduced lip 30 at one end, and mating female lip (not shown) at the opposite end, for connection of axially-adjacent sections in overlapping rabbet joints. Cement is applied in the joint to prevent the overlapping female lip from swelling under centrifugal force. The reinforcing cord thus underlies the joints which would otherwise be points of relative weakness subject to radial swelling. Alternatively, the coating 12 may have a rectangular cross-section so that the turns fit closely and eliminate the interstices between them. By varying the dimensions of this rectangular section variation in spacing between turns can be obtained if less reinforcing is desired.

The selection of the body and coil coating materials should take into consideration somewhat disparate requirements. The body material requires greater creep resistance, lower energy loss per cycle of flexure, and greater resistance to aging by prolonged exposure to heat, steam, or water, as well as chemical stability in its working environment. The coil coating generally need not meet the same standards in the foregoing respects, but should have the ability to bond quickly and easily to itself and to the body material, must have good abrasion resistance, and must withstand deterioration by grease. Polyurethane, chloroprene rubber and buna N are illustrative elastomers which meet both sets of requirements satisfactorily, although there are many other suitable materials. Additionally, it is desirable for applications to curved rolls that the inner surface of the sleeve have a lower coefficient of friction so that it may slide freely on the supporting spool structure, whereas the body surface should have a higher coefficient of friction to prevent relative slippage of sheet material running over the roll.

It will be understood by those skilled in the art that various changes and modifications may be made in the preferred mode of practice of the improved method, and in the preferred embodiment of the sleeve structure illustrated and described herein, without departing from the true spirit and scope of the invention, which we therefore intend to define in the appended claims without limitation to the details of the described practice.

What we claim is:

1. The method of manufacturing a reinforced expansible annular cylindrical sleeve for covering a roll, which comprises the steps of: winding reinforcing cord having a uniform coating of an elastomer having a relatively low coefficient of surface friction on a cylindrical mandrel having an outside diameter equal to the inside diameter of the finished sleeve to form a close-packed helical coil whereby the turns of said cord are uniformly spaced and cylindrically aligned, removing the mandrel, and molding an annular cylindrical sleeve body about the coil of an elastomer having a relatively high coefficient of surface friction, while bonding the cord coating to the sleeve body.

2. The method of manufacturing a reinforced expansible annular cylindrical sleeve for covering a roll, which comprises the steps of: winding reinforcing cord having a uniform elastomeric coating in a closely-packed helical coil on a cylindrical mandrel having an outside diameter equal to the inside diameter of the finished sleeve so that the turns of said cord are uniformly spaced and cylindrically aligned, cementing the turns to hold the coil form, removing the mandrel, and molding an annular cylindrical elastomeric sleeve body about the coil.

3. A reinforced expansible annular cylindrical sleeve element for covering a roll, comprising an annular helical coil of reinforcing cord having a coating of uniform thickness of an elastomeric material, the turns of said coil abutting one another axially to space the adjacent turns of said cord uniformly apart, said coil having an internal diameter equal to that of the sleeve element, and an annular body of molded elastomeric material extending circumferentially about the radially-outer surface of said coil to form a cylindrical outer sleeve surface, said body closely covering and being bonded to said coating, the material of said coating having a substantially lower coefficient of surface friction than the material of said body.

References Cited by the Examiner

UNITED STATES PATENTS

| | | | |
|---|---|---|---|
| 111,449 | 1/1871 | Greacen et al. | 29—127 |
| 125,787 | 4/1872 | Cable | 29—127 |
| 271,567 | 1/1883 | Bardwell | 29—127 |
| 2,199,197 | 4/1940 | Gatke | 264—103 X |
| 2,525,196 | 10/1950 | Bacon | 152—323 |
| 2,779,976 | 2/1957 | Roberts et al. | 264—275 X |
| 3,141,491 | 7/1964 | Ludewig et al. | 18—36 X |

LOUIS O. MAASSEL, *Primary Examiner.*